United States Patent Office 3,460,902
Patented Aug. 12, 1969

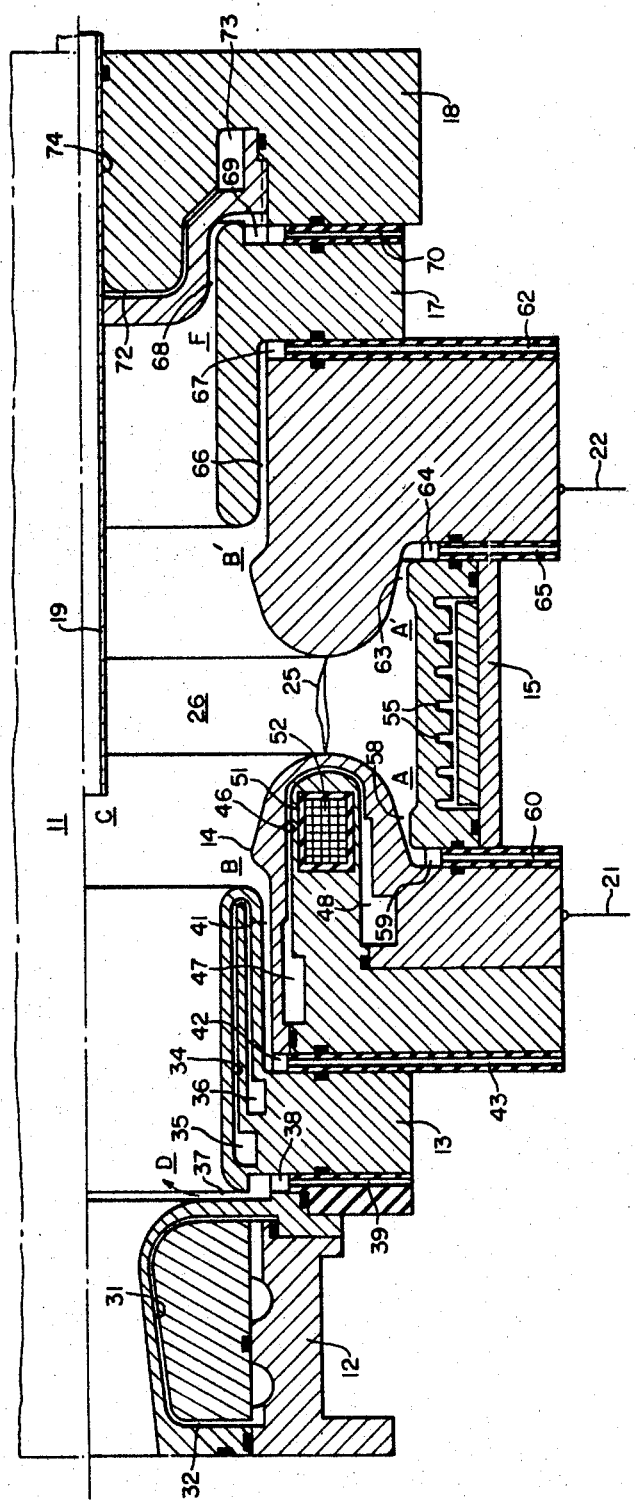

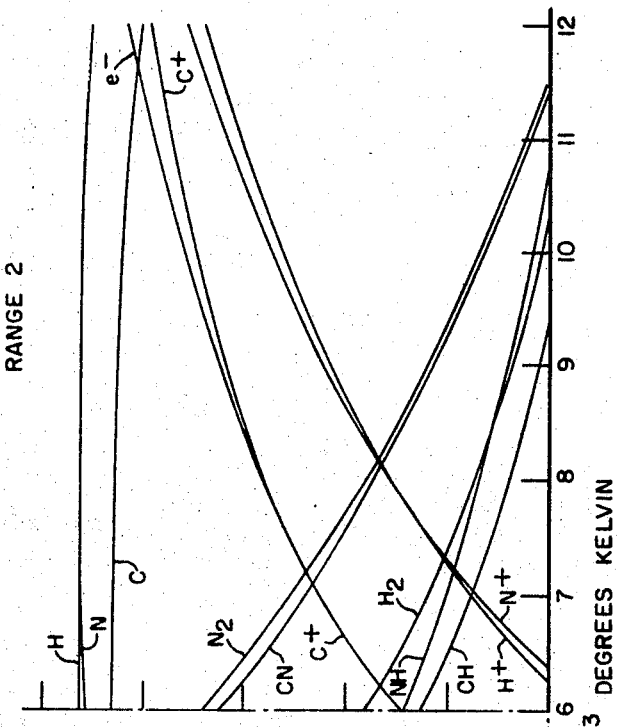
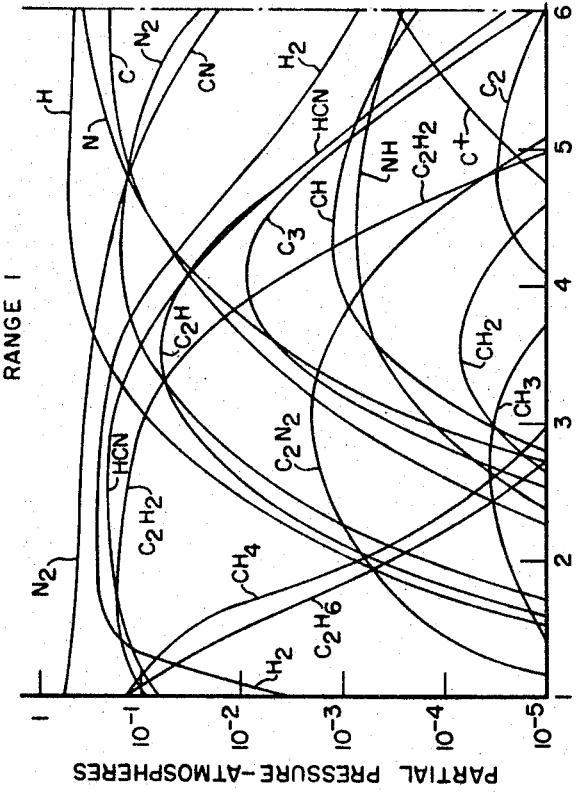

3,460,902
PROCESS FOR HYDROGEN CYANIDE AND ACETYLENE PRODUCTION IN AN ARC HEATER HAVING A ROTATING ARC
Chikara Hirayama, Murrysville, and Daniel A. Maniero, Monroeville, Pa., assignors to Westinghouse Electric Corporation, Pittsburgh, Pa., a corporation of Pennsylvania
Filed Aug. 2, 1967, Ser. No. 657,867
Int. Cl. C01c *3/04;* C07c *11/24*
U.S. Cl. 23—79          8 Claims

ABSTRACT OF THE DISCLOSURE

An arc heater having a rotating arc is used for the simultaneous preparation of acetylene and hydrogen cyanide by heating nitrogen gas with a hydrocarbon such as methane or natural gas. Preferably, the nitrogen is used as the gas heated by the arc and the methane is introduced into the hot nitrogen flame to be pyrolized thereby. The ratio of nitrogen to methane by volume is chosen to be within the range 1:1 to 2:1. The hydrogen cyanide and acetylene yields in this process are between 8 and 12% by volume for each product based on the total starting materials or feed stocks. The process minimizes carbon deposition on the electrodes and heat shields of the arc heater, thus providing greater life for the arc heater as well as increasing the efficiency of acetylene and hydrogen cyanide production.

Cross referencs to related applications

Other applications assigned to the assignee of the instant invention relating to chemical processing include (1) Ser. No. 446,012, filed Apr. 6, 1965, now Patent No. 3,389,189, by C. Hirayama et al. for Method and Equipment for the Pyrolysis and Synthesis of Hydrocarbons and Other Gases and Arc Heater Apparatus for Use Therein; (2) Ser. No. 471,914, filed July 14, 1965, by P. F. Kievast et al., for Arc Heater Apparatus for Chemical Processes; (3) Ser. No. 507,345, filed Nov. 12, 1965, by A. M. Bruning et al. for Cross Flow Arc Heater Apparatus and Process for the Synthesis of Carbon, Acetylene, and Other Gases; and (4) Ser. No. 527,789, filed Feb. 16, 1966, now Patent No. 3,284,782, by D. A. Maniero et al. for Direct Conversion Chemical Processing Arc Heater.

Background of the invention

The field of the invention relates to the art of using gas arc heaters in chemical processing. Our invention relates to a process for the simultaneous production of hydrogen cyanide and acetylene from a feed stock including, for example, nitrogen and methane or natural gas.

Description of the prior art

A number of patents have been issued relating to the use of an electric arc to pyrolize a gas and produce a decomposition product from which another gas is recovered. One such patent is No. 2,790,838, issued Apr. 30, 1957 to R. J. Schrader for Process for Pyrolysis of Hydrocarbons. Another such patent is Reissue No. 25,218, issued Aug. 7, 1962 to E. Schallus et al. for Process for Carrying Out Endothermic Reactions at High Temperatures.

Our process includes introducing nitrogen at one or more of a plurality of predetermined paths into an arc chamber where it will be heated by the arc to produce a high nitrogen atom concentration, and introducing methane or natural gas through a quartz or water cooled tube or through some other path into the arc chamber at a position slightly downstream of the position of the rotating arc. The hot nitrogen gas is rapidly mixed and reacted with the relatively cool methane, resulting in a temperature somewhat below 8000° K. The mixture is cooled, as by moving downstream, or by adding a quenching fluid, to a temperature at which both hydrogen cyanide and acetylene are present as stable recombination products in a substantial proportion of the total gas.

Summary of the invention

In summary, our invention includes the steps of heating nitrogen in an arc heater having rotating arc to a predetermined temperature at which the nitrogen is pyrolized, introducing methane or natural gas into the arc heater at a point downstream of the path of the rotating arc, the relatively cool methane being pyrolzied and thus reacting with the nitrogen, the mixture being rapidly quenched to a certain temperature at which the mixture contains both hydrogen cyanide and acetylene as stable recombination products in substantial proportion. Furthermore, to minimize carbon deposition on the electrode gap, we preferably operate at high nitrogen velocities between the electrodes. The hot gas is quenched by any of several processes such as rapid expansion, heat exchangers or hydrocarbon quenching followed by a water spray, some of these processes being described in the aforementioned copending patent applications. Additionally, our process includes the step of recovering hydrogen cyanide by separating it from the other products by bubbling through an alkaline bath and converting it to a cyanide salt.

By way of further summary, this invention pertains to the application of an arc heater having a rotating arc for the simultaneous preparation of acetylene and hydrogen cyanide by heating nitrogen gas with a hydrocarbon such as methane or natural gas, the nitrogen being heated and the methane being thereafter introduced at a relatively low temperature into the pyrolized nitrogen, the temperature of the methane being raised to a temperature at which the methane is pyrolized, and the temperature of the nitrogen being lowered, the mixture of the methane and nitrogen being thereafter lowered to a certain temperature at which acetylene and hydrogen cyanide are present in substantial proportion. Preferably, the arc heater is operated at high nitrogen velocity.

Brief description of the drawings

FIGURE 1 shows a suitable arc heater arrangement for practicing the process of our invention;
FIGS. 2A and 2B are graphs illustrating the operation of the apparatus of FIG. 1, and illustrating the process carried on by the apparatus of FIG. 1;
FIG. 3 shows an arc heater in combination with a heat exchanger for quenching;
FIG. 4 shows an arc heater providing its exhaust through an alkaline bath to convert the hydrogen cyanide to a cyanide salt; and
FIG. 5 shows an arc heater in combination with an expansion chamber.

Description of processes comprising the preferred ways of producing the final products of our invention Particular reference is made now to FIGURE 1 where an arc heater generally designated 11 is shown, having, reading left to right, a nozzle 12, heat shield 13, electrode 14, heat shield 15, electrode 16, heat shield 17, end plate 18 and a feed or quench tube 19. The electrodes 14 and 16 have leads 21 and 22 connected thereto respectively symbolizing means for connecting the electrodes across a source of potential to produce the arc 25. Arc 25 takes place in an arc chamber generally designated 26. The feed and/or quench tube 19 may be composed of quartz or other heat resistant material having an opening in the end thereof at point C and which may pass through a suitable bore 74 in the end plate 18. The nozzle is seen to have a cooling passageway 31 and to have an exit orifice 32. The passageway 31 communicates at each end thereof with fluid headers which in turn have fluid inlets and outlets connected thereto, these not being shown for simplicity of illustration.

The heat shield 13 adjacent the nozzle member also has a cooling passageway 34 therethrough near all portions of the surface thereof which may be exposed to direct radiation from the arc and communicating at the ends thereof with fluid headers 35 and 36 which it will be understood have fluid outlets, not shown for convenience of illustration, communicating therewith.

A selected gas or water may be introduced into the arc chamber 26 through a path designated D, the path being annular in shape and extending around the entire inside periphery of the wall of the arc chamber, gas or water reaching path D by way of annular space 37 communicating with header 38 having inlet 39.

A selected gas may also enter arc chamber 26 at the annular path designated B, through the space 41 communicating with gas header 42 having gas inlet 43.

The aforementioned electrode 14 is seen to have a cooling passageway 46 communicating with headers 47 and 48 which it is understood have fluid inlet and outlet means communicating therewith, the inlet and outlet means not being shown for convenience of illustration. Electrode 14 has a coil housing 51 of insulating material with a magnetic field producing coil 52 therein, the electrode 14 being annular in shape and the coil in the coil housing being annular in shape, the housing being disposed within a suitable annular cavity in the electrode, coil 42 having lead means, not shown for convenience of illustration, connected thereto for bringing a current to the coil to set up a magnetic field. This magnetic field, in conjunction with the magnetic field set up by a coil in the electrode 16, not shown for convenience of illustration, which is similar to the coil 52 and has energizing means connected thereto, rotates the arc 25 in a substantially annular path around the annular electrodes 14 and 16 at a high rate of speed, for example, 1000 cycles per second.

The aforementioned heat shield 15 is fluid cooled, having a number of troughs 55 therein which communicate with fluid inlet headers and fluid outlet headers, not shown for convenience of illustration, having fluid inlet and fluid outlet means connected thereto respectively.

A selected gas may enter the arc chamber 26 through an annular path designated A by way of annular space 58 from the gas header 59 having gas inlet 60.

Adjacent the heat shield 15 on the right-hand side thereof is the aforementioned second electrode 16 which is preferably very similar to the electrode 14, if not identical, and which has a fluid passageway, not shown, corresponding to passageway 46 therein for cooling all surfaces of the electrode exposed to direct radiation and all surfaces thereon which the arc 25 may come in contact with, that is all surface areas on which the arc spot may take place. Between heat shield 15 and electrode 16 a selected gas may enter the arc chamber 26 through an annular path designated A from annular space 63, gas header 64 and gas inlet 65.

Disposed between the electrode 16 and the end plate 18 is an additional portion of the heat shield, this additional portion being designated 17, and it will be understood that heat shield portion 17 has a fluid flow passageway therearound corresponding to passageway 34 of heat shield 13, and has fluid headers, fluid inlets and fluid outlets communicating therewith for cooling all surfaces of the heat shield exposed to heat of radiation and convection within the arc chamber, this last-named passageway and the inlets and outlets not being shown for convenience of illustration.

A selected gas may enter the arc chamber 26 through an annular path B from annular space 66, header 67, and inlet 62.

The aforemnetioned plate 18 is seen to have a passageway 72 therein for the flow of cooling fluid, the passageway 72 connecting with the header 73; the feed and/or quench tube 19 is seen extending through the bore 74 in the end plate. A selected gas may enter the arc chamber 26 through tube 19 at path C.

A selected gas may be admitted to arc chamber 26 through path F from annular space 68, gas header 69 and gas inlet 70.

It will be understood that FIGURE 1 is half of a cross section beginning at a position differing slightly from the axis of the arc heater so that the tube 19 may be shown in the manner illustrated in which the diameter thereof may have been shown not to scale for clarity of illustration. It will be understood that the nozzle 12, heat shield 13, electrode 14, heat shield 15, electrode 16, heat shield 17 and end plate 18 are annular in shape and furthermore it is to be understood that the electrode 14 is insulated electrically from heat shield 13 and heat shield 15 by means not shown in detail for convenience of illustration, and that electrode 16 is insulated from heat shield 15 and heat shield 17 by means not shown in detail for convenience of illustration.

As previously stated, an object of our invention is to provide a process for the simultaneous production of acetylene and hydrogen cyanide in an arc heater having a rotating arc. The process is especially suited to this type of arc heater utilizing nitrogen and a hydrocarbon as raw or feed stock materials.

Particular reference is made now to FIGS. 2A and 2B where there is shown an example of equilibrium recompositions for a system containing hydrogen, carbon and nitrogen in a ratio of 1:1:1 at a total pressure of one atmosphere. The hydrogen and carbon may be obtained by pyrolysis and decomposition of a hydrocarbon, or may be separately provided. Variations of this ratio cause shifts in the relative proportions of recompositions. For maximum hydrogen cyanide and acetylene yield the carbon to hydrogen to nitrogen ratio should be of the order of 1:2:1 to 1:2:2. Thus, with a mixture of methane and nitrogen as starting materials, the ratio of methane to nitrogen should be about 1:1 to 1:2.

According to one process of our invention, we introduce nitrogen into the arc chamber through one or more of the folowing paths all upstream of the arc path: A', B', or F. We introduce methane through tube 19 at point C downstream of the arc path. The hot nitrogen gas pyrolizes the methane and produces free atoms, and radicals of C, H, and others. The enthalpy ratio of $CH_4$ to $N_2$ at 4000° K. is approximately 7. With an $N_2/CH_4$ ratio of >2:1, and assuming a reasonable average $N_2$ flame temperature of ~8000° K., the resulting gas formed by the mixing of $N_2$ and $CH_4$ should be higher than 2500° K. The mixture is cooled by moving downstream, by adding a quenching gas through path B or D or both, or adding a liquid quench through path D, to a temperature which will assure a maximum, or near thereto, yield of HCN and $C_2H_2$.

According to another process, we introduce nitrogen upstream of the arc through one or more of the paths A', B', or F and introduce the methane or natural gas through path B or D, or both.

Preferably the $CH_4$ is introduced into the region of maximum average nitrogen temperature, where nitrogen atom concentration is highest.

According to a further process, we introduce nitrogen through one or more paths upstream of the arc, introduce methane through paths B or C or both, and introduce a quenching fluid, such as water, through path D.

In FIG. 3, an arc heater 78 is seen delivering its exhaust by way of heat exchanger 79, which further reduces the temperature of the gas, to exhaust nozzle 80.

In FIG. 4, an arc heater 82 is seen delivering its hot gases by way of 84 to means 83 forming an alkaline bath. Here the HCN is converted to a cyanide salt, and the $C_2H_2$ is recovered from nozzle 85.

Wherever $CH_4$ is mentioned, it will be understood that natural gas (~95% $CH_4$) may be used.

Particulate coal may be used as a process material, as may petroleum.

The hydrocarbon may be introduced upstream of the arc, although this is not preferable.

As described in one of the aforementioned copending applications for production of acetylene, the product gas is rapidly quenched if a water quench is used at path D, and the acetylene is "frozen" so that no further undesired chemical changes occur.

It is to be noted in FIGS. 2A and 2B that the maximum hydrogen cyanide and acetylene concentrations appear at a temperature range of 2000° K. to 2500° K., which is typical. By way of further summary, at the high arc temperatures the gases $N_2$ and $CH_4$ are essentially dissociated. As the mixed dissociated gases flow downstream, the atoms and radicals recombine to form acetylene and hydrogen cyanide, and there will also be some precipitation of carbon in the form of soot. However, the soot formation resulting from the carbon, hydrgen and nitrogen system should be less than for a carbon-hydrogen system. The hydrogen cyanide and acetylene remain essentially unchanged on rapid quenching at concentrations of 8 to 15% each. Since the maximum concentration of these useful products occur at approximately 2500° K., the quenching process may be somewhat simpler than that used in a pure methane system, that is, one where methane is pyrolized and the desired recombination product is, for example acetylene.

As shown in FIGS. 2A and 2B, the equilibrium is for a system in which the elements hydrogen, carbon and nitrogen are simultaneously present. Therefore, these elements may be introduced into the arc heater in any form. For example, the hydrogen and carbon may be added as a hydrocarbon gas, liquid or solid, or as carbon and gaseous hydrogen or as gasified coal; the nitrogen may be added as nitrogen gas, or in any combined form with hydrogen and/or carbon, such as ammonia. Economic considerations, however, strongly suggest the use of nitrogen gas with natural gas which is approximately 95% methane, petroleum or coal as the process raw materials.

One of the chief operational difficulties encountered in the processing of a hydrocarbon, such as methane, in the present types of rotating arc heaters is the deposition of carbon on the heat shields and electrodes. These carbon deposits often build up rapidly so that the operational period with the hydrocarbon gas is seriously shortened. This difficulty is minimized by producing hydrogen cyanide and acetylene from nitrogen and a hydrocarbon, for exmaple, methane. Since maximum yields of hydrogen cyanide and acetylene will be obtained by heating carbon, hydrogen and nitrogen in the ratio of 1:2:1 to 1:2:2, the ratio of nitrogen to methane will be 1:1 to 2:1 in the starting materials or feed stocks. For practical reasons, it may be advantageous to use a minimum ratio of 2:1 of nitrogen to methane. In this way, the nitrogen is used as the arcing gas and is introduced in the annular paths shown at A and A', B', and F in FIGURE 1. The methane is introduced through the water cooled tube or quartz quench tube 19 at a distance slightly downstream from the downstream electrode 14. This point of introducing methane is of importance in minimizing the diffusion of the carbon to the electrodes. Preferably, the methane is introduced into the region of maximum average nitrogen temperature. The methane may also be introduced into the hot flame slightly downstream at the gas entrance path which is annular in shape and which is designated D. The hot nitrogen flame is rapidly quenched by mixing with methane. As previously stated, the enthaply ratio of methane to nitrogen at 4000° K. is approximately 7; with a nitrogen to methane ratio equal to slightly larger than 2:1, and assuming an average nitrogen gas temperature of approximately 8000° K., the resulting gas formed by the mixing of nitrogen and methane is at a temperature higher than 2500° K., and this last-named temperature assures a maximum, or near maximum, yield of hydrogen cyanide and acetylene.

In order to minimize carbon deposition on the wall portion forming the electrode gap, it is advantageous to operate at high nitrogen velocities between the electrodes.

Generally stated, the hot gas may be quenched by any one of several processes, such as rapid expansion as illustrated in FIG. 5 where arc heater 90 is shown delivering its output to expansion chamber 91, a heat exchanger such as shown in FIG. 3, or hydrocarbon quenching followed by water spray, heretofore described.

The hydrogen cyanide is easily separated from the other products by bubbling through an alkaline bath and converting it to a cyanide salt, as shown in FIG. 4.

The foregoing written description and the drawings are illustrative and exemplary only and are not to be interpreted in a limiting sense.

We claim:

1. Process for chemical conversion which comprises the steps of creating an arc having a predetermined arc power in a confined area having a gas outlet therefor at a position removed from the arc zone, the arc extending in a predetermined direction, causing the arc to follow a substantially repetitive circular path, the circular plane of said path being substantially perpendicular to said predetermined direction, passing nitrogen through said circular path from the outside thereof toward the inside thereof at a flow rate in accordance with the arc power at substantially all points in said last named path, the arc rotating in said circular path at a sufficient speed whereby at least a substantial portion of the nitrogen is pyrolized, introducing a hydrocarbon gas by another substantially circular path into the pyrolized nitrogen, said last-named path being near the circular arc path so that the hydrocarbon gas is pyrolized by mixing with the pyrolized nitrogen, the mixture having a temperature somewhat below 8000° K., the atoms and free radicals of the pyrolized hydrocarbon gas reacting with the nitrogen, cooling the resultant pyrolized mixture to a temperature of the order of 2500 deg. K at which last-named temperature at least one desired recombination product is present in substantial proportion, and obtaining said desired recombination product from said gas outlet.

2. A process according to claim 1 in which acetylene and hydrogen cyanide are desired recombination products and are simultaneously produced.

3. A process according to claim 1 in which the hydrocarbon gas is methane and in which the ratio of nitrogen to methane brought into the confined area lies within the range 1:1 to 2:1.

4. A process according to claim 1 wherein the step of cooling the pyrolized mixture includes adding an additional relatively cold hydrocarbon gas to the mixture while it is in the confined area to reduce the temperature thereof.

5. A process according to claim 2 including the additional step of passing the acetylene and hydrogen cyanide through an alkaline bath wherein the hydrogen cyanide is converted to a cyanide salt, and the acetylene is recovered after passing through said bath.

6. A process according to claim 1 including the additional step of removing additional heat from the gas mixture by heat exchange.

7. A process according to claim 1 including the additional step of introducing a liquid spray into the pyrolized mixture while in the confined area to further reduce the temperature thereof.

8. Process for chemical conversion which comprises the step of creating an arc having a predetermined arc power in a confined area having a gas outlet therefor at a position removed from the arc zone, the arc extending in a predetermined direction, causing the arc to follow a substantially repetitive circular path, the circular plane of said path being substantially perpendicular to said predetermined direction, the portion of said confined area between the gas outlet and the arc zone being the downstream portion ad the remainder of said confined area being the upstream portion, introducing nitrogen into said confined area in a substantially circular path upstream of the arc at a flow rate in accordance with the arc power and the speed of rotation of the arc whereby at least a substantial portion of the nitrogen is pyrolized, said pyrolized nitrogen moving toward the downstream portion of the confined area and moving toward said gas outlet, introducing a hydrocarbon gas by another substantially circular path downstream of the arc path and into the pyrolized nitrogen, said hydrocarbon gas being pyrolized by mixing with the hot pyrolized nitrogen, the mixture having a temperature somewhat below 8000 deg. K., the atoms and free radicals of the pyrolized hydrocarbon gas reacting with the nitrogen, cooling the resultant pyrolized mixture to a temperature of the order of 2500 deg. K. at which last-named temperature acetylene and hydrogen cyanide both constitute substantial proportions of the total gas, and obtaining said recombination products from said gas outlet.

References Cited

UNITED STATES PATENTS

| | | | |
|---|---|---|---|
| 2,742,344 | 4/1956 | Inman et al. | 23—79 |
| 3,262,757 | 7/1966 | Bodmer | 23—284 |
| 3,168,592 | 2/1965 | Cichelli et al. | 260—679 |

OTHER REFERENCES

E. J. Hellund: The Plasma State, 1961, pp. 2, 8, 12 and 65.

OSCAR R. VERTZ, Primary Examiner

H. S. MILLER, Assistant Examiner

U.S. Cl. X.R.

23—151; 204—171, 325; 260—679